United States Patent
Lee

(10) Patent No.: US 8,061,605 B2
(45) Date of Patent: Nov. 22, 2011

(54) RFID MONITOR

(75) Inventor: Robin Lee, Hamburg, NJ (US)

(73) Assignee: Production Resource Group, L.L.C., New Windsor, NY (US)

( * ) Notice: Subject to any disclaimer, the term of this patent is extended or adjusted under 35 U.S.C. 154(b) by 927 days.

(21) Appl. No.: 12/030,366

(22) Filed: Feb. 13, 2008

(65) Prior Publication Data

US 2008/0203160 A1    Aug. 28, 2008

Related U.S. Application Data

(60) Provisional application No. 60/889,713, filed on Feb. 13, 2007.

(51) Int. Cl.
*G06F 19/00* (2011.01)
*G06Q 30/00* (2006.01)
*G06Q 90/00* (2006.01)

(52) U.S. Cl. ....... 235/385; 235/375; 235/383; 340/5.92; 340/572.1; 705/28; 705/29

(58) Field of Classification Search ........... 235/375, 235/382, 383, 385; 340/5.92, 572.1; 705/28, 705/29
See application file for complete search history.

(56) References Cited

U.S. PATENT DOCUMENTS

| | | | |
|---|---|---|---|
| 5,886,634 A * | 3/1999 | Muhme | 340/572.1 |
| 6,804,578 B1 * | 10/2004 | Ghaffari | 700/229 |
| 2001/0000019 A1 * | 3/2001 | Bowers et al. | 340/572.1 |
| 2002/0008140 A1 * | 1/2002 | Reynolds et al. | 235/385 |
| 2005/0240495 A1 * | 10/2005 | Harper et al. | 705/28 |
| 2006/0017541 A1 * | 1/2006 | Nguyen | 340/5.81 |
| 2006/0290471 A1 * | 12/2006 | Van Alstyne | 340/10.1 |
| 2007/0288294 A1 * | 12/2007 | Olsen et al. | 705/9 |
| 2010/0148925 A1 * | 6/2010 | Kaplan | 340/10.1 |

* cited by examiner

*Primary Examiner* — Thien M. Le
*Assistant Examiner* — Tuyen K Vo
(74) *Attorney, Agent, or Firm* — Law Office of Scott C Harris Inc

(57) ABSTRACT

Inventory control and monitoring system uses an RFID reader to read tags on multiple lights passing through a portal. A light turns green after all the tags have been read. Information from those tags is added to an inventory database, which keeps track of which lights, and how many of each kind of light, is in stock. Locations of the lights can also be added to the inventory system.

19 Claims, 2 Drawing Sheets

RFID MONITOR

The present application claims priority from provisional application No. 60/889,713, filed Feb. 13, 2007, the disclosure of which is herein incorporated by reference.

BACKGROUND

Automated lights are often rented for use with events, which may use them for a short time or a long time. After the event has ended, the lights are returned. They need to then be returned to stock, so that they can be rented to someone else. Inventory management is extremely important, since inventory determines what products are available for rental at a subsequent time.

SUMMARY

The present application describes techniques of automated monitoring and handling of inventory in a rental facility, and specifically, a rental facility for stage lighting and other similar equipment.

DETAILED DESCRIPTION

The present application describes a light renting and receiving technique, including automated structures for determining whether a stage lighting device, e.g., a light or a winch, or a prop has been returned. An embodiment describes tracking a light, but it should be understood that other inventoried devices could analogously be tracked using the techniques disclosed in the embodiments.

The light is stored in an appropriate location once returned and inventory of the lights is maintained.

Figure 1:
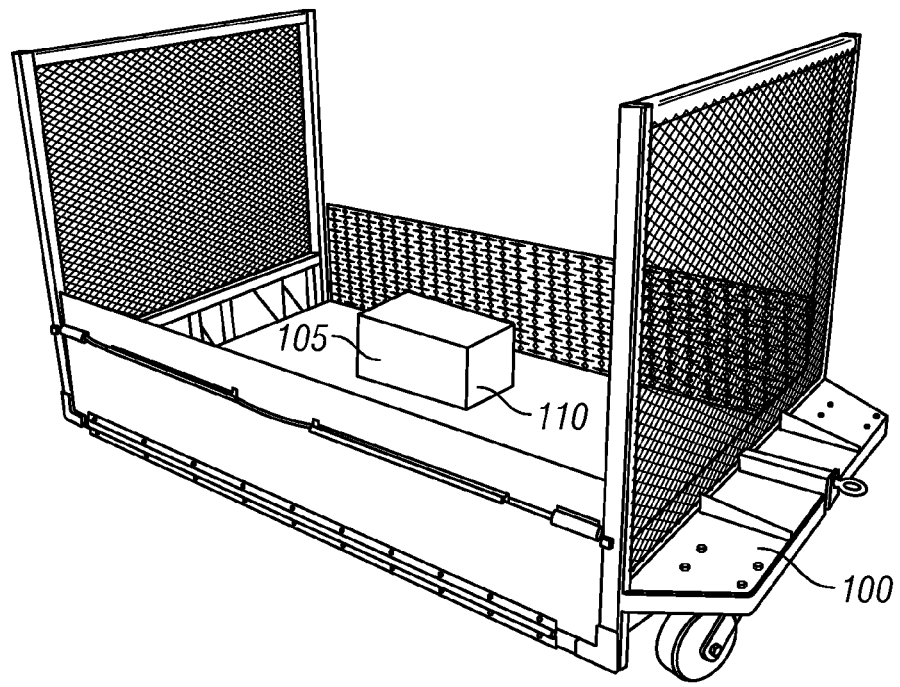
FIG. 1 shows a light on a low-boy type of cart.
Figure 2:
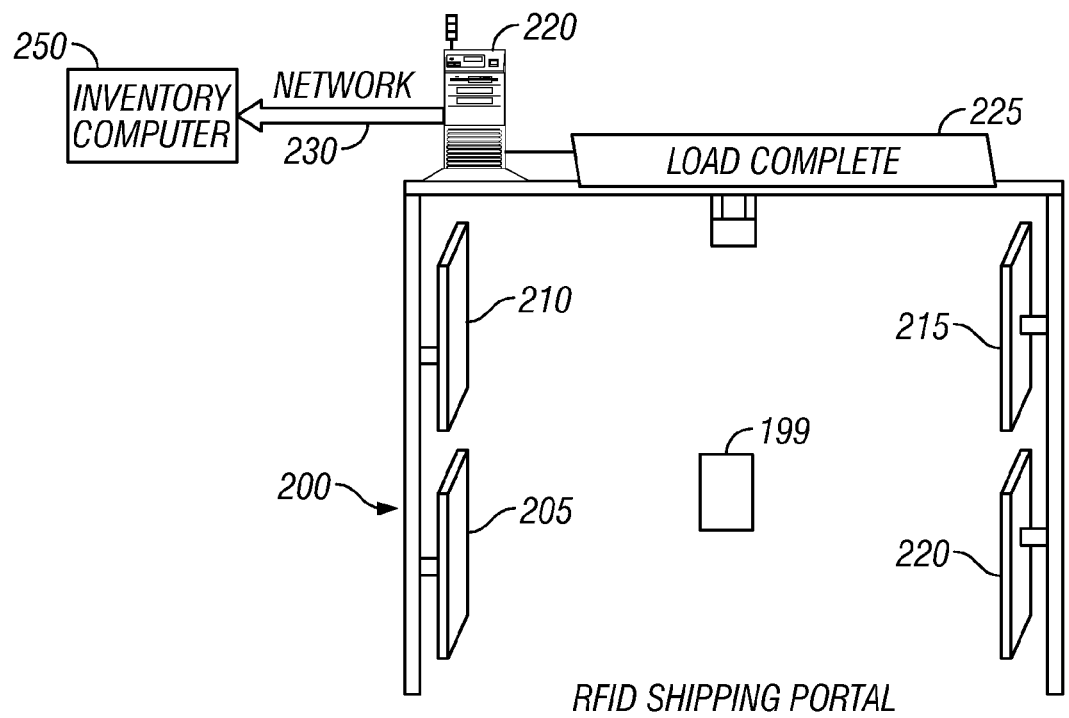
FIG. 2 shows an RFID shipping portal.

The automated lights are typically returned on a truck. The lights are removed from the truck, and according to an embodiment, placed on a low-boy cart of the type shown in FIG. 1 for further movement. FIG. 1 shows a light 105 on the cart. The light 105 includes an RFID tag 110. There may be many lights (and other devices) on the cart 100, for example there may be 50 or 100 lights on the cart. In addition, while this describes the use of a single tier low-boy cart, there may be multiple tiers on this cart. The low-boy cart may produce advantages, since it is easier to locate the lights onto this cart with its lower platform.

The cart is then moved through an RFID shipping portal shown as 200. This portal includes a number of RFID receivers, 205, 210, 215, 220. By placing a number of receivers around the edge of the shipping portal, the RFID tags can be located at any place on the light.

The RFID receivers 210, 205 are driven by a controller 225, according to a stored program. The controller 225 samples each RFID chip, shown generically as 199, within its scanned volume. Once it has completely sampled all RFID chips, the "load complete" light is lit, informing the operator that all products on the cart have been scanned.

The controller 225 sends information over the network 230 to the inventory computer 250. The inventory computer 250 receives therefore a notation that the product has been brought back from rental, into storage. The inventory control computer thus updates its store of inventory to indicate that the specific light that is uniquely identified by the designation on the RFID tag has been returned. The inventory computer also stores certain information about each light, including, for example, the model number or type of the light. The computer also looks up this model information, and also adds to its inventory calculation that one more of this model is now in inventory. The light may be marked in the computer as being preliminary, at least until the light is inspected and deemed ready to rent.

As an alternative, the computer may simply store the raw information. Later determinations of what specifically is in the computer may be obtained by sorting the fields of raw information.

Figure 3:
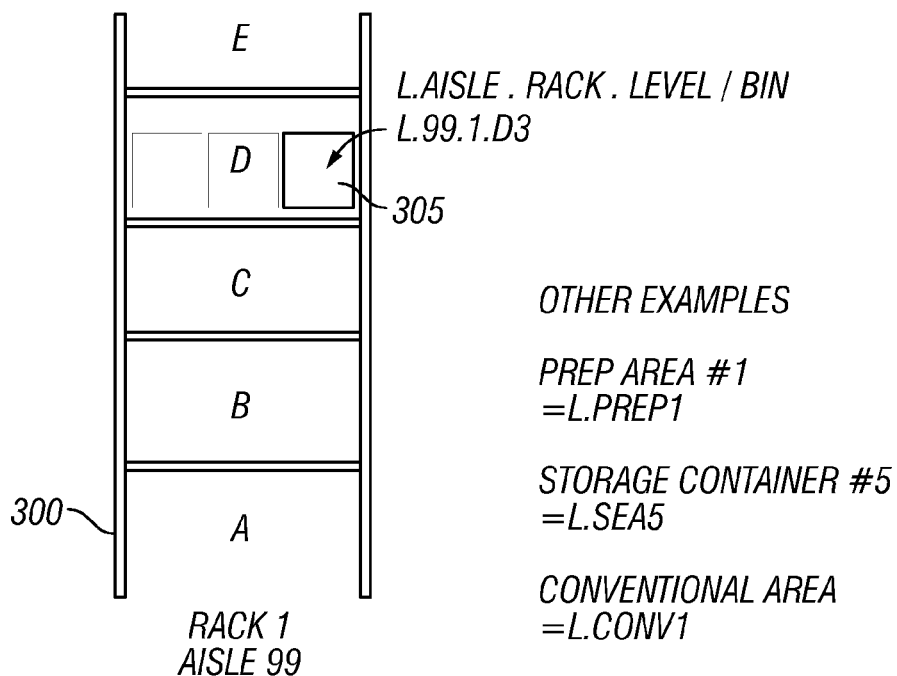
FIG. 3 shows a primary locating technique.

Once in the warehouse, the products can be stored in a number of different locations. FIG. 3 illustrates the primary locating technique which is used. According to this technique, each area receives a rack number, an aisle number, a level number, and a bin number. For example, the rack 300 may be labeled as rack 1 and aisle 99. Within each rack, the level may also be indicated, for instance, level 0 may be the fourth level in the rack. The bin number is the bin on the rack.

Once the product is located in its final area, a location number, of the form shown in FIG. 3, is added to the inventory computer 250 to indicate its location. For example, the product located at the location 305 may receive the inventory number L.99.1.DE3.

Figure 4:
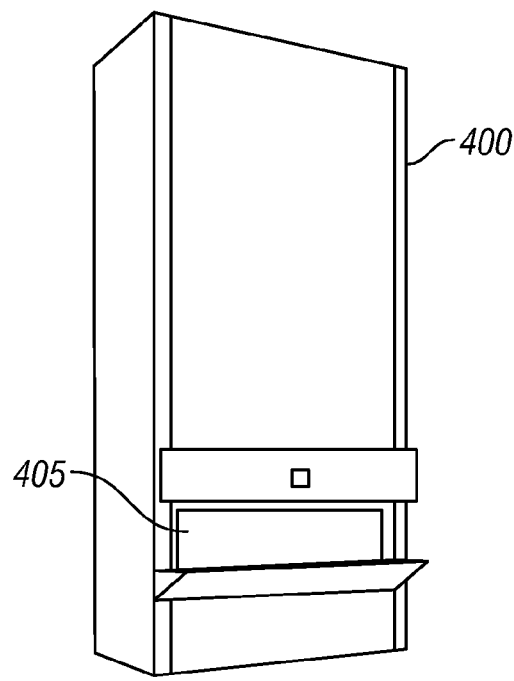
FIG. 4 shows an additional storage device.

FIG. 4 indicates an additional storage device 400, which can be used. According to FIG. 4, the vertical storage device allows products to be stored anywhere within the vertical storage. Products are entered through the door 405, and stored on a specified level within the vertical storage device. Each vertical storage device may also be located according to its designation, and may be labeled with a level, and a bin number.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other stage-usable devices other than lights can be stored in this way, e.g., props, hoists, and the like. Also, while the above describes only an embodiment where items that are being returned are automatically detected, it is also intended to be used in an embodiment where these items are being sent out.

The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Also, the inventor intends that only those claims which use the words "means for" are intended to be interpreted under 35

USC 112, sixth paragraph. Moreover, no limitations from the specification are intended to be read into any claims, unless those limitations are expressly included in the claims.

What is claimed is:

1. A method of inventory monitoring, comprising:

automatically detecting information from plural stage lighting devices that are being returned into a storage facility, as said stage lighting devices are passed through a specified area, said automatically detecting information from all of said plural stage lighting devices;

once said information from each of said stage lighting device has been detected as they are passed through said specified area, a plurality at the same time, changing an indicator to a state that indicates that all the information from all of said plural stage lighting devices has been detected;

automatically adding information to an inventory database indicative of said stage lighting device having been returned, responsive to said detecting; and using said information that has been automatically added to maintain an inventory.

2. A method as in claim 1, further comprising adding location information to said inventory database, said location representing a location of said item.

3. A method as in claim 2, where said location includes a rack location and a location of a level on the rack.

4. A method as in claim 1, wherein said automatically detecting uses an RFID reader to read RF ID tags on said plural stage of lighting devices simultaneously.

5. A method as in claim 4, wherein said specified area include readers on four different sides of said specified area.

6. A method as in claim 1, wherein said information from said stage lighting devices includes a unique designation of a specific stage lighting device, and said automatically adding comprises determining a model number of said stage lighting device, and maintaining an indication of how many of said stage lighting models are in inventory.

7. An inventory monitoring system, comprising:

a reader, automatically reading information from plural stage lighting devices that are being returned, as said stage lighting devices are passed through a specified area all at the same time;

an indicator, responsive to said reader, which has states that indicate a reading state of said reader in reading said information, which has a first state that indicates that said information from all of said stage lighting devices has not been completely read, and has a second state that indicates that said information from all of said stage lighting devices has been completely read;

an inventory computer, receiving said information, and automatically adding said information to an inventory database and using said automatically added information to maintain an inventory.

8. A system as in claim 7, wherein said inventory computer also stores a location associated with at least plural of said stage lighting devices to said inventory database, said location representing a location of said item.

9. A system as in claim 8, where said location includes a rack location and a location of a level on the rack among plural levels on the rack.

10. A system as in claim 7, wherein said reader is an RFID reader.

11. A system as in claim 7, wherein said stage lighting devices include at least one light, and at least one item other than a light.

12. A system as in claim 7, wherein said reader includes multiple different readers, surrounding four sides of said specified area.

13. A system as in claim 7, wherein said information from said stage lighting devices includes unique designations of each of a plurality of specific stage lighting devices, and said inventory computer automatically determines a model number of said stage lighting device from said unique designation, and maintains an indication of a number of each of said models that are in inventory.

14. A method of inventory monitoring, comprising:

automatically detecting information from plural stage lighting devices that are being returned into a storage facility, as said stage lighting devices are passed through a specified area, said automatically detecting information from plural stage lighting devices, which includes at least one lighting device, and at least non-lighting device;

determining that plural of said stage lighting devices has been detected as they are passed through said specified area all at the same time, and informing a user that said plural of said devices has been detected;

automatically adding information to an inventory database indicative of said stage lighting device having been returned, responsive to said detecting; and using said information that has been automatically added to maintain an inventory.

15. A method as in claim 14, further comprising adding location information to said inventory database, said location representing a location of said item.

16. A method as in claim 15, where said location includes a rack location and a location of a level on the rack.

17. A method as in claim 14, wherein said automatically detecting uses an RFID reader to read RF ID tags on a plurality of devices simultaneously.

18. A method as in claim 14, wherein said automatically detecting information comprises detecting information from at least four readers which surround said specified area.

19. A method as in claim 14, wherein said information from said stage lighting devices includes unique designations of each of a plurality of specific stage lighting devices, and said inventory computer automatically determines a model number of said stage lighting device from said unique designation, and maintains an indication of a number of each of said models that are in inventory.

* * * * *